Jan. 14, 1936.  F. A. KING  2,027,439
PROPELLER MOUNTING MECHANISM
Filed March 9, 1934   2 Sheets-Sheet 1
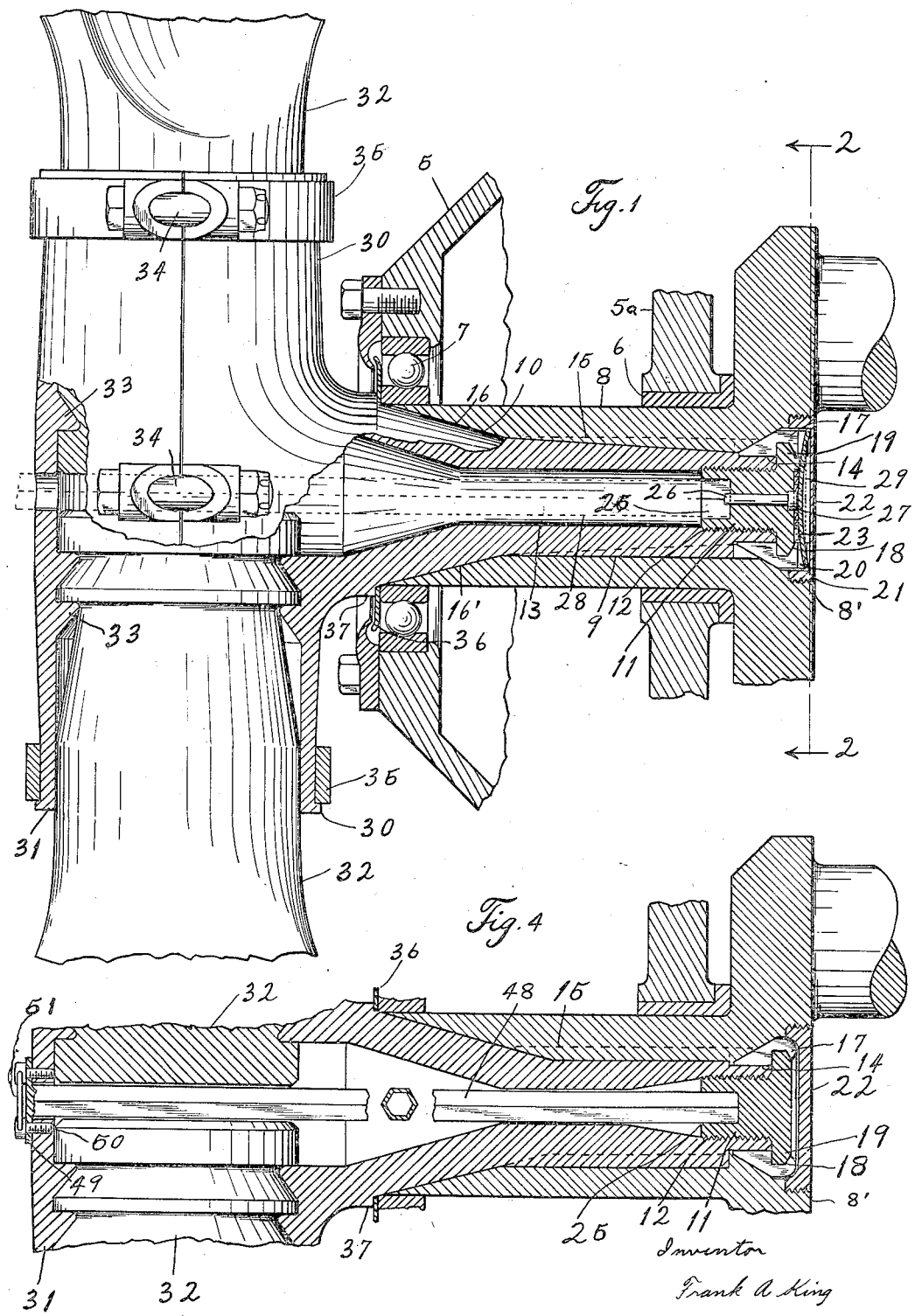

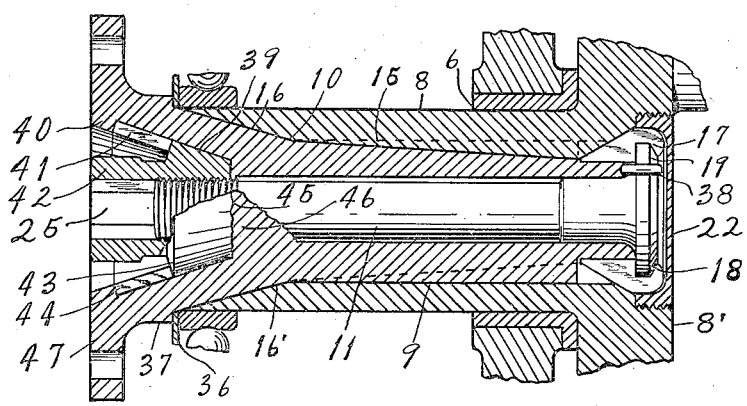
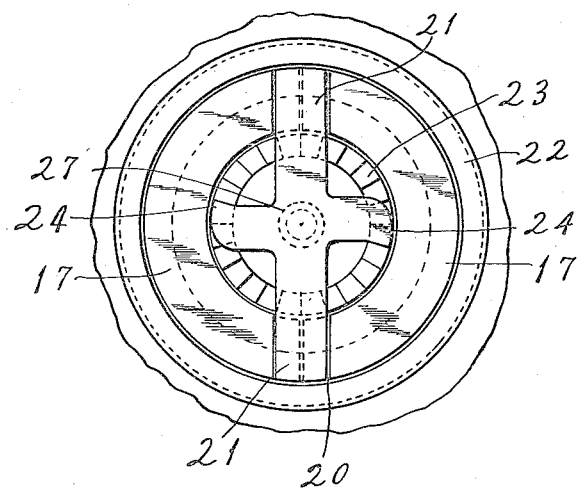

Patented Jan. 14, 1936

2,027,439

UNITED STATES PATENT OFFICE 2,027,439

PROPELLER MOUNTING MECHANISM

Frank A. King, Los Angeles, Calif.

Application March 9, 1934, Serial No. 714,816

25 Claims. (Cl. 170—173)

This invention appertains to aeronautical engine crank shafts, and screw propellers, and more particularly to means for mounting the propeller to the crank shaft.

Heretofore difficulty has been experienced in constructing variable pitch propellers about the power or crank shaft, which largely requires the use of a hub made up of heavy metal, as does also the power shaft, the latter of which extends directly through the working parts of the variable pitch propeller.

Therefore the primary object of this invention is to eliminate the extending portion of the crank shaft, thus greatly facilitating the construction of variable pitch propellers and at the same time very materially reducing the composite weight and cost of the adjustable type propeller and its mounting members such as the crank shaft.

Heretofore propellers have been rough in their performance due to the hub construction being such as to require a lengthy boss which in turn requires spacing the propeller apart from its supporting bearing thus permitting vibration thereof as a result of the heavy over hanging load. This invention affords the advantage of reducing the space between the propeller and its supporting bearing to the minimum and consequently reducing vibration thereof.

It is an important object of this invention to provide the crank shaft with a socket or hollow splined bore, having oppositely disposed internal conical surfaces at each end thereof.

It is another important object of this invention to provide the propeller with a shank which is adapted to enter the socket of said shaft, the shank being substantially secured therein by screw means. The shank also being provided with an integral sleeve member or flange, obviously the latter may be formed in any suitable manner to meet various blade mounting requirements.

It is an object of this invention to provide the shank with a screw securing means which is also provided with a socket. The screw means being provided with locking means which are actuated through the medium of said last mentioned socket.

Another feature of this invention is the provision of self alining means in connection with said screw means, for axially alining the shank with respect to said shaft, the self alining means being adapted to operate as the screw means is tightened, whereas reverse movements thereof functions to release the shank from the socket, in a self extracting manner.

Further objects and advantages will appear from the following detail description, when taken in connection with the accompanying drawings, it being expressly understood, however, that the drawings are designed for the purpose of illustrating only and not a definition of the limits of this invention, reference being had to the appending claims for this purpose.

In the drawings, like reference characters designate similar parts in the several views.

Fig. 1 is a longitudinal sectional view of a shank formed integral with a conventional type propeller blade sleeve member showing parts in elevation.

Fig. 2 is a cross sectional view on line 2—2 of Fig. 1 showing the self locking means as applied to the screw.

Fig. 3 is a modified form of shank, showing a bolt extending therethrough.

Fig. 4 is another modification of the shank.

Referring to the drawings more in detail the numeral 5 designates the bearing support member of the forward portion of a fuselage or an extension on the forward extremity 5a of an engine wherein is journaled by means of bearings 6 and 7, a hollow crank shaft 8.

In carrying out my invention I provide a tapered hollow shank 9, which is secured in the socket or hollow 10 of the shaft 8 by a screw 11 which is threaded in internal threads 12 in the hollow portion 13 of the shank 9.

The shank 9 is provided with an external cylindrical portion 14 and tapered splines as indicated by dotted lines 15, which engage corresponding splines in the shaft 8, and at its forward portion the shank 9 is formed with an external conical surface 16, which abuts a corresponding internal conical surface 16' of the crank shaft. At the opposite end the shaft is provided with a similar internal conical surface of a steeper pitch wherein is located a corresponding split cone 17, the inner surface of which is cylindrical, except for an annular recess 18 the latter of which encircles the head 19 of screw or bolt 11 and which cone encircles the cylindrical surface 14 on the shank.

The end of cone 17 is provided with diametrically oppositely disposed recesses 20, which as for example are adapted to receive the ends of a cross shaped spring 21. Cone 17 and the spring 21 are loosely retained in their respective seats by a cap 22 threaded in the cheek 8' of the crank shaft, The head 19 of screw 11 is provided with an annular row of ratchet teeth 23 (as shown in Fig. 2) adapted to engage the outer ends of cross arms 24 of spring 21 which arms are slightly curved in to conform with the ratchet teeth 23, while the opposite end of screw 11 is formed with an internal hexagon socket 25 and is concentrically drilled to receive a headed pin 26. The head 27 of pin 26 abuts against the central portion of cross spring 21 the arms 24 of which engaging the ratchet teeth 23 lock the screw 11 against accidental movement.

Obviously the application of a hexagon bar in the form of a tool as indicated by dotted lines 28 inserted in the socket 25 under a slight pressure functions to depress the pin 26 and the spring 21 as indicated by dotted lines 29, thus disengaging the cross arms 24 from the ratchet teeth 23. On the contrary unthreading movement of the screw 11, through the medium of head 19 tends to release the grip of cone 17 on the cylindrical portion 14 and as the cone is retained in place by the cap 22, a continued unthreading movement serves to extract the shank from the shaft.

When the screw is securely screwed in the shank by reverse process and in view of splines 15 it is obvious cone 17 will be substantially drawn against its respective conical seat and since due to its pitch and greater surface contact it will be substantially united to the shaft 8, as a unitary structure.

The shank 9 is provided at its outer end with a split sleeve extending transversely thereof and disposed in close proximity to the outer bearing 7, and which sleeve embodies a pair of members 30 and 31 contoured on their inner surfaces to conform to the configuration of the root ends of a conventional type of propeller blade 32 now in use.

The two sleeve members 30 and 31 are securely alined and attached to each other by means of shoulders 33, bolts 34 and clamping rings 35.

Abutting the bearing 7 is the conventional type oil slinger 36, which is retained in place by means of a shoulder 37 on the shank 9.

Fig. 3 shows a modified form of screw means which is in the form of a bolt 11, the head 19 being keyed to shank 9, by a pin 38, thus it is prevented from rotating with respect thereto.

The bolt 11 extends through the shank to the internal conical surface 39, which is provided with an annular internal shoulder 40, thus forming a recess 41, wherein is located a shouldered nut 42 that is threaded on the bolt 11. Located in the recess 41 and abutting shoulder 43 on the nut 42 is a tapered split expansion ring 44, which loosely retains nut 42 in the recess 41.

One end of nut 42 is provided with a hexagon socket 25, the opposite end being wavy like with alternating slight curves 45; the nut seat 46 thereof in said shank also being formed with an undulating surface corresponding thereto.

Obviously there is sufficient spring or diaphragm action in the flange-like head 19 and bolt 11 to permit nut 42 to be screwed against its corresponding undulating fixed seat 46, with sufficient pressure to substantially secure the shank in its respective socket, as its undulating seat 46 functions to self lock the nut thereto.

If it is desired to detach the shank from the shaft it is only necessary to unscrew nut 42, whereupon its shoulder 43 the ring 44 and the shoulder 40 serve as shank self-releasing means.

As shown in Fig. 3 the shank is formed integral with an apertured flange 47, obviously upon which may be attached any suitable type of propeller (not shown), thus forming a quick detachable flange for the crank shaft, which facilitates the assembling of radial bearings and other parts over a crank shaft having a flange.

In the modification shown in Fig. 4 the splines 15 are machined on conventional or parallel lines, while the locking means consists of a hexagon tube 48 one end of which is provided with an apertured flange 49 which is secured in the sleeve member 31 by screws 50 and lace wire 51, thence it extends between the inner ends of blades 32 and through the hollow of the shank and is engaged with the hexagon socket 25.

From the foregoing it is obvious that I have provided a crank shaft with a quick detachable flange which is capable of a wide range of versatility, such as reducing dimensions and weight of the propeller hub and its respective shaft, without impairing the strength thereof. It is to be understood, however, that the reductions in hub dimensions are replaced by longer blades which are composed of lighter material.

The forms of construction and arrangement above described do not restrict the scope, they may vary according to the type of crank shaft or the type of propeller to be mounted thereon.

What I claim and desire to secure by Letters Patent is:

1. In a propeller mounting the combination of; a crank shaft having a splined socket, a blade supporting member provided with a corresponding splined shank engaging said socket, screw means securing said shank in said socket, the screw means being provided with a second socket, and a screw locking means arranged to be actuated through the medium of said second socket.

2. In a propeller mounting the combination of; a rotary crank shaft having a splined socket, a blade supporting member provided with a corresponding splined shank engaging said socket, screw means provided with a shank alining member and arranged to secure said shank in said socket, the screw means being provided with a second socket and a screw locking means arranged to be actuated through the medium of said second socket.

3. In a propeller mounting the combination of; a rotary crank shaft having a splined socket, a blade supporting member provided with a corresponding splined shank engaging said socket, screw means provided with a shank alining member and arranged to secure said shank in said socket, the screw means being provided with a second socket and a screw locking means arranged to actuate through the medium of said second socket, a screw locking member associated with the screw means, the latter being actuated by longitudinal displacement of said locking member in said second socket.

4. In a propeller mounting the combination of; a rotary crank shaft having a splined socket, a blade supporting member provided with a corresponding splined shank engaging said socket, screw means provided with a shank alining member and arranged to secure said shank in said socket, the screw means being provided with a second socket and a screw locking means arranged to be actuated through the medium of said second socket, a screw self locking member being located in said second socket, whereby longitudinal movement of the self locking member functions to unlock said screw means.

5. In a propeller mounting the combination of; a rotary crank shaft having a splined socket, a blade supporting member provided with a corresponding splined shank engaging said socket, screw means provided with a shank alining member and arranged to secure the shank in said socket, the screw means being provided with a second socket and a screw locking means arranged to be actuated through the medium of said second socket, a screw self-locking means associated with said shank and said screw means, the locking means being arranged to act in response to rotational movement of certain of its members.

6. In a propeller mounting the combination of; a rotary crank shaft having a splined socket, a blade supporting member provided with a corresponding splined shank engaging said socket, screw means provided with a shank alining member and arranged to secure the shank in said socket, the screw means being provided with a second socket and a screw locking means arranged to be actuated through the medium of said second socket, a screw self locking means comprising fixed and movable surfaces having undulating faces intimately associated with each other.

7. In a propeller mounting the combination of; a rotary crank shaft having a splined socket, a blade supporting member provided with a corresponding splined shank engaging said socket, a cone intermediate the socket and the shank, screw means engaging the cone and securing said shank in said socket, the screw means being provided with a second socket, and a screw locking means arranged to be actuated through the medium of said second socket.

8. In a propeller mounting the combination of; a rotary crank shaft having a splined socket, and a crank cheek, a blade supporting member provided with an integral corresponding splined shank engaging said socket, a cap threaded in said cheek, a cone intermediate the socket and the cap, screw means engaging the cone and the shank and securing said shank in said socket, the screw means being provided with a second socket, and a screw locking means arranged to be actuated through the medium of said second socket.

9. In a propeller mounting the combination of; a hollow crank shaft having a splined socket; a blade supporting member provided with a corresponding splined shank adapted to engage said socket, automatic locking and unlocking screw means provided with a socket and adapted to secure said shank in first mentioned socket, said screw means also being adapted to self extract said shank from said first mentioned socket by the application of a tool in said second socket.

10. In a propeller mounting the combination of; a crank shaft having a tapered bore, splines in said bore, a blade supporting member having an integral corresponding tapered shank, the latter being provided with internal threads and a screw threaded therein, a split cone encircling the screw and adapted to aline and secure said shank in the bore of said shaft.

11. In a propeller mounting the combination of; a crank shaft having a tapered bore therethrough and a transposed conical bore at the smaller end thereof, splines between said tapered bore and said conical bore, a blade supporting member having an integral hollow shank, the latter engaging said tapered bore, a screw located in the hollow of said shank, and a nut threaded thereon, the nut and screw adapted to secure said shank in the tapered bore of said shaft.

12. In a propeller mounting the combination of; a crank shaft having a tapered bore, and transposed conical seats at opposite ends thereof, tapered splines interposed between said seats, a blade supporting member having an integral hollow shank, the latter being adapted to engage said splines and one of said seats, a bolt located in the hollow of said shank the bolt being provided with a head, a cone seated in the other of said seats and embracing said bolt head, a nut threaded on said bolt and adapted to secure said shank in the bore of said shaft in a self locked manner.

13. In a propeller mounting the combination of; a crank shaft having a tapered bore therethrough and a transposed conical bore at the smaller end thereof, splines between said tapered bore and the conical bore, a blade supporting member having an integral shank the latter being adapted to engage said tapered bore, and provided with internal threads at its smaller end a screw threaded therein, a split cone seated in said conical bore encircling said screw, the screw and cone being adapted to axially aline and secure said shank in the bore of said shaft.

14. In a propeller mounting the combination of; a rotary crank shaft having a double tapered bore therethrough and a transposed conical bore at the smaller end thereof, tapered splines located between said first mentioned bore and said conical bore, a blade supporting member having an integral shank corresponding to and engaging said first mentioned bore, said shank being provided with internal threads at its smaller end and a screw threaded therein, a split cone seated in said conical bore encircling said screw, the screw and the cone being adapted to axially aline and secure said shank in bore of said shaft.

15. In a screw propeller mounting, a bearing support, a bearing carried thereon, a crank shaft extending through said bearing, a propeller blade supporting member in close proximity to said bearing, an integral shank on said member extending through said bearing and interconnected interiorly of said shaft, and blade clamping means on said member.

16. In a screw propeller mounting, a bearing support, a bearing carried therein, a drive shaft journaled in the bearing having a shank receiving socket, a propeller blade mounting member in close proximity to said bearing, an integral shank on said member extending through the bearing and interconnected to said shaft in said socket, means in said socket for alining the shank to said shaft, propeller blades, and clamping means adapted to secure the blades to said member.

17. In a screw propeller mounting, a bearing support, a bearing therein, a drive shaft journaled in the bearing having a shank receiving socket, a blade supporting member in close proximity to said bearing, an integral shank on said member abutting said bearing and extending therethrough and interconnected to said shaft in said socket, means including tapered surfaces in said socket for alining the shank to said socket propeller blades and clamping means adapted to secure said blades to said member.

18. In a screw propeller mounting, a bearing support, a bearing carried thereby, a crank shaft having a shank receiving socket located in said bearing, a sleeve member in close proximity to said bearing, a shank integral with the member engaged in the socket in said shaft, means located in said socket for drivably connecting the shank to the shaft, blades seated in said sleeve member, and a complementary sleeve member adapted to secure said blades to said first mentioned member.

19. In a screw propeller mounting, a bearing support, a bearing carried thereby, a crank shaft adapted to receive a shank, shouldered blades for complementary sleeve members, a sleeve member in close proximity to said bearing, a shank integral with said member and extending substantially through said bearing, means interiorly of said member for drivably connecting the shank to the shaft, and clamping means including a complementary sleeve member adapted to secure said blades to said first mentioned member.

20. In a screw propeller mounting, a bearing support, a forward bearing carried thereby, a crank shaft having a socket adapted to receive a shank and journaled in said bearing, a flange in close proximity to said bearing, means on the flange for supporting a screw propeller, a shank integral with said flange abutting said bearing, and means located in said shank and socket for alining and drivably connecting said shank to the socket of said shaft.

21. In a screw propeller mounting, a bearing support, a bearing carried thereby, a rotatable shaft having a socket adapted to receive a shank, a flange in close proximity to said bearing, the flange being adapted to support a screw propeller, a shank integral with said flange abutting the bearing and extending therethrough into said socket, splines interconnecting said shank and shaft, a nut screwed on said shank, and means interconnecting said nut and shaft.

22. In a screw propeller mounting, bearing supports, bearings carried thereby and spaced apart, a shaft journaled by one of said bearings, a screw propeller supporting member abutting the other of said bearings, a shank integral with said supporting member and journaled in said last mentioned bearing, and means intermediate the bearings for drivably connecting said shank to said shaft.

23. In a screw propeller mounting, a bearing support, a bearing carried thereby, a crank shaft having tapered splines, a propeller supporting member in close proximity to said bearing, a hollow shank on said member extending through said bearing, tapered splines on the shank engaging the splines on said shaft, means including a nut located in the hollow of said shank for alining and securing said shank to said shaft.

24. In a screw propeller mounting, a bearing support, a bearing carried thereby, a crank shaft having tapered splines, a propeller supporting member in close proximity to said bearing, a hollow shank on said member extending through said bearing, tapered splines on the shank engaging the splines on said shaft, means including conical surfaces and a nut located in the hollow of said shank for alining and securing said shank to said shaft.

25. In a screw propeller mounting, a bearing support, a bearing carried thereby, a crank shaft having tapered splines, a propeller supporting member in close proximity to said bearing, a hollow shank on said member extending through said bearing, tapered splines on the shank engaging the splines on said shaft, screw coupling means including conical surfaces in said shank and shaft for alining and securing the shank to the shaft.

FRANK A. KING.